United States Patent
Duhamel et al.

(10) Patent No.: US 10,625,819 B2
(45) Date of Patent: Apr. 21, 2020

(54) CONSTRUCTION OF MOTORIZED WHEEL FOR VEHICLE MOTORIZATION

(71) Applicant: BIONX CANADA INC., Aurora (CA)

(72) Inventors: Jean-martin Duhamel, Sherbrooke (CA); Daniel Levesque, Candiac (CA); Pascal Larose, Sherbrooke (CA); Jerome Cros, Quebec (CA)

(73) Assignee: BIONX CANADA INC., Aurora (CA)

( * ) Notice: Subject to any disclaimer, the term of this patent is extended or adjusted under 35 U.S.C. 154(b) by 0 days.

(21) Appl. No.: 16/207,882

(22) Filed: Dec. 3, 2018

(65) Prior Publication Data
US 2019/0100277 A1    Apr. 4, 2019

Related U.S. Application Data

(60) Division of application No. 15/456,747, filed on Mar. 13, 2017, now Pat. No. 10,155,565, which is a
(Continued)

(51) Int. Cl.
*B60K 7/00* (2006.01)
*H02K 1/16* (2006.01)
(Continued)

(52) U.S. Cl.
CPC ............... *B62M 6/65* (2013.01); *B60B 1/02* (2013.01); *B60B 1/04* (2013.01); *B60B 1/042* (2013.01);
(Continued)

(58) Field of Classification Search
CPC .. B60B 1/02; B60B 1/04; B60B 1/041; B60B 1/042; B60B 1/043; B60K 7/0007;
(Continued)

(56) References Cited

U.S. PATENT DOCUMENTS 5,272,938 A * 12/1993 Hsu .................... B62M 6/40
                                                    74/594.1
6,559,564 B1   5/2003 Itou
(Continued)

FOREIGN PATENT DOCUMENTS

DE    202010003487 U1    2/2011
JP        H1086885 A     4/1998

OTHER PUBLICATIONS

International Search Report for corresponding application PCT/CA2014/050431 dated May 6, 2014; dated Jul. 18, 2014.
(Continued)

*Primary Examiner* — John D Walters
(74) *Attorney, Agent, or Firm* — Dickinson Wright PLLC

(57) ABSTRACT

A motorization apparatus for a motorized wheel comprises an axle secured to a frame of a vehicle. A rotor unit has poles of magnet material. A stator unit having slots and teeth secured to the axle is inward of said rotor to define a clearance gap therewith such that the rotor unit is rotatable about the stator core. An arrangement of coils is wound around the teeth of the stator unit, the coils adapted to be powered to induce a rotation of the rotor unit relative to the stator unit. A structure comprises hub portions rotatably mounted to the axle, the structure having lateral walls defining an inner volume for the rotor unit and the stator unit, the structure supporting the rotor unit. The structure comprises attachment members connected to spokes of the motorized wheel, located radially inward of the clearance gap between the rotor unit and the stator unit.

20 Claims, 10 Drawing Sheets

Related U.S. Application Data continuation of application No. 14/888,828, filed as application No. PCT/CA2014/050431 on May 6, 2014, now Pat. No. 9,595,850.

(60) Provisional application No. 61/824,139, filed on May 16, 2013, provisional application No. 61/819,896, filed on May 6, 2013.

(51) Int. Cl.

| | | |
|---|---|---|
| *B62M 6/65* | (2010.01) | |
| *H02K 11/00* | (2016.01) | |
| *B60B 1/02* | (2006.01) | |
| *H02K 11/20* | (2016.01) | |
| *H02K 11/33* | (2016.01) | |
| *H02K 21/22* | (2006.01) | |
| *H02K 1/18* | (2006.01) | |
| *H02K 1/27* | (2006.01) | |
| *H02K 1/30* | (2006.01) | |
| *H02K 3/52* | (2006.01) | |
| *H02K 5/06* | (2006.01) | |
| *H02K 7/14* | (2006.01) | |
| *B60L 50/51* | (2019.01) | |
| *B60L 50/20* | (2019.01) | |
| *B60B 1/04* | (2006.01) | |
| *H02K 7/08* | (2006.01) | |
| *H02K 11/21* | (2016.01) | |
| *H02K 1/14* | (2006.01) | |
| *H02K 3/18* | (2006.01) | |
| *H02K 3/28* | (2006.01) | |
| *H02K 5/22* | (2006.01) | |

(52) U.S. Cl.
CPC ............ *B60K 7/0007* (2013.01); *B60L 50/20* (2019.02); *B60L 50/51* (2019.02); *H02K 1/146* (2013.01); *H02K 1/16* (2013.01); *H02K 1/187* (2013.01); *H02K 1/27* (2013.01); *H02K 1/2786* (2013.01); *H02K 1/30* (2013.01); *H02K 3/18* (2013.01); *H02K 3/28* (2013.01); *H02K 3/522* (2013.01); *H02K 5/06* (2013.01); *H02K 5/225* (2013.01); *H02K 7/08* (2013.01); *H02K 7/14* (2013.01); *H02K 11/0094* (2013.01); *H02K 11/20* (2016.01); *H02K 11/21* (2016.01); *H02K 11/33* (2016.01); *H02K 21/222* (2013.01); *B60L 2200/12* (2013.01); *B60L 2220/14* (2013.01); *B60L 2220/44* (2013.01); *B60L 2220/50* (2013.01); *B60L 2240/12* (2013.01); *B60L 2270/145* (2013.01); *H02K 2203/03* (2013.01); *H02K 2213/03* (2013.01); *Y02T 10/641* (2013.01); *Y02T 10/7005* (2013.01)

(58) Field of Classification Search
CPC .. B60K 7/0092; B60L 11/007; B60L 11/1803; B60L 50/20; B60L 50/51; H02K 1/16; H02K 1/187; H02K 1/27; H02K 1/2786; H02K 1/30; H02K 1/146; H02K 5/06; H02K 5/225; H02K 3/18; H02K 3/28; H02K 3/522; H02K 7/08; H02K 7/14; H02K 11/001; H02K 11/0073; H02K 11/0094; H02K 21/22; H02K 21/222; B62M 6/65
USPC .............................................. 180/65.51, 220
See application file for complete search history.

(56) References Cited

U.S. PATENT DOCUMENTS

| | | |
|---|---|---|
| 6,630,764 B1 | 10/2003 | Dube et al. |
| 6,836,036 B2 | 12/2004 | Dube |
| 6,866,111 B2 | 3/2005 | Dube et al. |
| 6,888,280 B2 | 5/2005 | Dube et al. |
| 7,204,011 B2 * | 4/2007 | Maslov ..................... B60L 8/00 29/592.1 |
| 7,706,935 B2 | 4/2010 | Dube et al. |
| 8,183,726 B2 | 5/2012 | Rittenhouse |
| 8,395,291 B2 | 3/2013 | Calley et al. |
| 8,922,087 B1 * | 12/2014 | Rittenhouse ........... H02K 1/148 310/112 |
| 2011/0259658 A1 * | 10/2011 | Huang .................... B60K 1/04 180/65.51 |
| 2011/0285328 A1 | 11/2011 | Rittenhouse |
| 2013/0119809 A1 | 5/2013 | Levesque et al. |

OTHER PUBLICATIONS

Written Opinion for corresponding application PCT/CA2014/050431 dated May 6, 2014; dated Jul. 18, 2014.

* cited by examiner

CONSTRUCTION OF MOTORIZED WHEEL FOR VEHICLE MOTORIZATION

CROSS-REFERENCE TO RELATED APPLICATIONS

This application is a divisional of U.S. patent application Ser. No. 15/456,747 filed Mar. 13, 2017, which is a continuation of U.S. patent application Ser. No. 14/888,828 filed on Nov. 3, 2015, which is a national stage of International Application No. PCT/CA2014/050431 filed May 6, 2014, which claims priority to U.S. Provisional Application No. 61/824,139, filed on May 16, 2013 and U.S. Provisional Application No. 61/819,896, filed on May 6, 2013. The entire disclosures of each of the above applications are incorporated herein by reference.

TECHNICAL FIELD

The present application pertains to a construction of a wheel featuring a wheel motor, a.k.a., motorized wheel, wheel hub drive, wheel hub motor, hub motor, in-wheel motor, etc, for vehicle motorization.

BACKGROUND OF THE ART

Wheel motors are commonly used for the motorization of vehicles, such as bicycles, scooters, lightweight motorcycles, cars, etc. A wheel motor comprises a stator hub with windings, and a rotor wheel rotating about the hub. The rotor wheel comprises a plurality of magnets driven by the current in the windings. Advantageously, the wheel motor operates as a direct drive; there is no transmission to convert the motor output to a given speed. The power output of the wheel motor is as a function of the electrical current fed to the wheel motor.

There are continuous efforts to increase the power output from wheel motors. Some parameters can be used to alter the power output of the wheel motors, such as rotor size. However, there may be constraints to adjusting a rotor size, as wheels come in standard dimensions. For instance, bicycle wheels for adult bicycles typically come within standard diameters, such as 26 inches, 29 inches, 700 mm or 650 mm. In order to maximize the size of the motors, spokes are conventionally attached to an outer periphery of the motor casings, with substantially shorter spokes than usual for standard-diameter wheels. As spokes add to the comfort of the rider for instance by their flexing action, the shortening of the spokes may have an adverse effect on the riding experience.

SUMMARY

It is therefore an aim of the present disclosure to provide a construction of a wheel and wheel motor that addresses issues associated with the prior art.

Therefore, in accordance with the present disclosure, there is provided a motorization apparatus for a motorized wheel comprising: an axle adapted to be secured to a frame of a vehicle; a rotor unit having a plurality of poles of magnet material; a stator unit secured to the axle and being inward of said rotor and defining a clearance gap with the rotor unit such that the rotor unit is rotatable about the stator core, the stator unit having slots and defining teeth between said slots; an arrangement of coils of insulated wire being wound around the teeth of the stator unit, the coils adapted to be powered to induce a rotation of the rotor unit relative to the stator unit; a structure comprising hub portions rotatably mounted to the axle, the structure having lateral walls defining an inner volume for the rotor unit and the stator unit, the structure supporting the rotor unit relative to the stator unit for the rotor unit to rotate with the structure about the stator unit, the structure further comprising attachment members adapted to be connected to spokes of the motorized wheel, the attachment members being located radially inward of the clearance gap between the rotor unit and the stator unit.

Further in accordance with the embodiment, the hub portions are on opposite sides of the motorization apparatus and each have: a tubular portion; and at least one bearing per tubular portion connecting the tubular portion to the axle for rotation of the tubular portion relative to the axle.

Still further in accordance with the embodiment, each of the hub portions has a flange projecting radially from the tubular portion, the attachment members being on the flange.

Still further in accordance with the embodiment, the flange has a crenellated periphery and the attachment members are holes in the crenellated periphery.

Still further in accordance with the embodiment, the attachment members are on a diameter of the flange ranging between 20 and 500 mm.

Still further in accordance with the embodiment, the structure comprises cover plates connected to the hub portions, the cover plates extending radially from the hub portions and interconnected to one another at an outer periphery of the motorization apparatus, the cover plates defining concurrently a substantial portion of the inner volume enclosing the rotor unit and the stator unit.

Still further in accordance with the embodiment, the cover plates are made of a non-ferrous material.

Still further in accordance with the embodiment, at least the tubular portions of the hub portions are made of metal.

Still further in accordance with the embodiment, one of the hub portions further comprises one of a freehub and a freewheel hub having a first end connected to and rotating with the tubular body, and a second cantilevered end projecting away from the hub portion.

Still further in accordance with the embodiment, at least one channel is defined in an outer surface of the shaft for routing at least one cable for powering or controlling a power to the arrangement of coils, a first end of the at least one channel communicating with the inner volume of the structure, and a second end of the at least one channel being exterior to the structure.

Still further in accordance with the embodiment, a dropout abutment on the axle is adapted to prevent rotation of the axle relative to the frame of the vehicle.

Still further in accordance with the embodiment, a printed circuit board (PCB) is secured to the stator unit and wired to the arrangement of coils.

Still further in accordance with the embodiment, at least one receptacle is fixedly secured to the stator unit and positioned in one of the slots, the at least one receptacle adapted to receive therein a sensor of the PCB to determine an orientation of the rotor unit relative to the stator unit.

Still further in accordance with the embodiment, the stator unit comprises eighty-four of the slots.

Still further in accordance with the embodiment, the eighty-four slots are regrouped in four continuous sets of teeth per phase.

Still further in accordance with the embodiment, each of the continuous sets of teeth per phase has seven teeth.

Still further in accordance with the embodiment, there are one of eighty, eighty-eight and ninety-two of the poles.

Still further in accordance with the embodiment, one of spline connection, knurling, serrated splines is between the axle and the stator unit.

Still further in accordance with the embodiment, a ratio of rotor radius to rotor width of at least 10.

Still further in accordance with the embodiment, there is provided a motorized wheel comprising: the motorization apparatus according to the above; a rim; and spokes extending from the rim to the hub portions of the structure, a wheel inner volume being bound by innermost ones of the spokes, with at least the rotor unit being within the wheel inner volume.

Still further in accordance with the embodiment, the arrangement of coils of insulated wire being wound around the teeth of the stator unit is within the wheel inner volume.

Still further in accordance with the embodiment, the rim has a diameter between 584 mm and 700 mm.

In accordance with a further embodiment of the present disclosure, there is provided a motorization apparatus comprising an outer rotor with eighty, eighty-eight or ninety-two poles constructed with segments of permanent magnet material sequentially magnetized north and south, the outer rotor adapted to be part of a wheel and rotating with the wheel about an axis thereof; a stator core of ferromagnetic material spaced inwardly of said rotor and defining a clearance gap with the rotor such that the rotor is rotatable about the stator core, the stator core having an outer diameter ranging between 150 mm and 500 mm, said stator core having eighty-four slots and defining teeth between said slots; and a three-phase winding with coils of insulated wire being wound around the teeth of the stator core.

Still further in accordance with the further embodiment, the outer rotor has eighty-eight poles, and wherein the three-phase winding is divided in four sets of consecutive teeth for each of the three phases Still further in accordance with the further embodiment, each of the four sets of a same phase has two pairs of sets that are diametrically opposed in the stator core.

Still further in accordance with the further embodiment, the three-phase winding are divided into four sets of seven consecutive teeth for each of the three phases.

Still further in accordance with the further embodiment, each said phase of the three-phase winding is divided into sets of six and eight consecutive teeth.

Still further in accordance with the further embodiment, the stator is fixed to an axle of the wheel.

Still further in accordance with the further embodiment, the rotor is adapted to be operatively connected to a freewheel or freewheel hub of a vehicle to rotate therewith in one rotational orientation.

Still further in accordance with the further embodiment, each said phase comprises 28 teeth.

DESCRIPTION OF THE PREFERRED EMBODIMENTS

Figure 1:
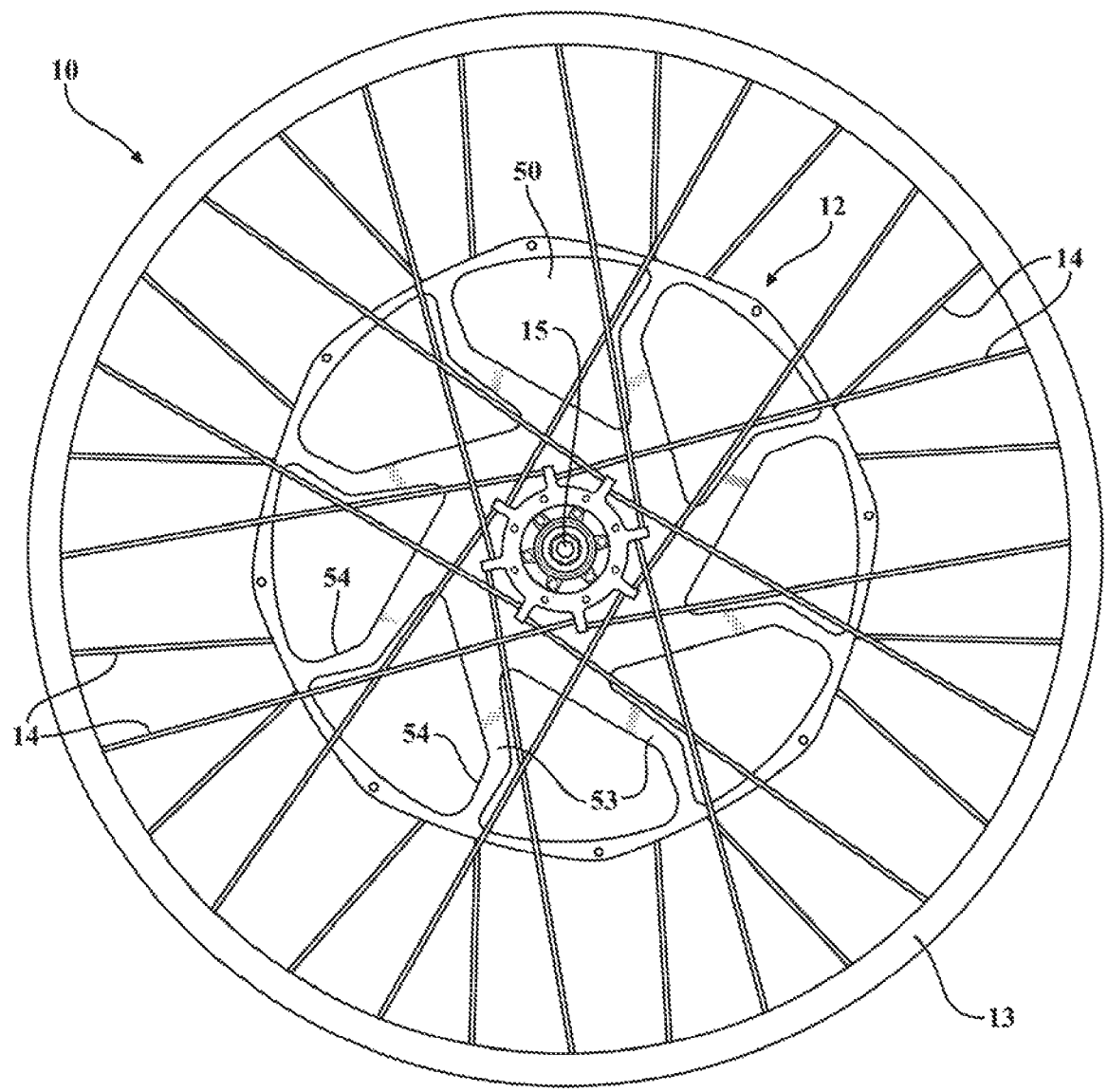
FIG. 1 is a side view of a motorized wheel in accordance with the present disclosure.
Figure 2:
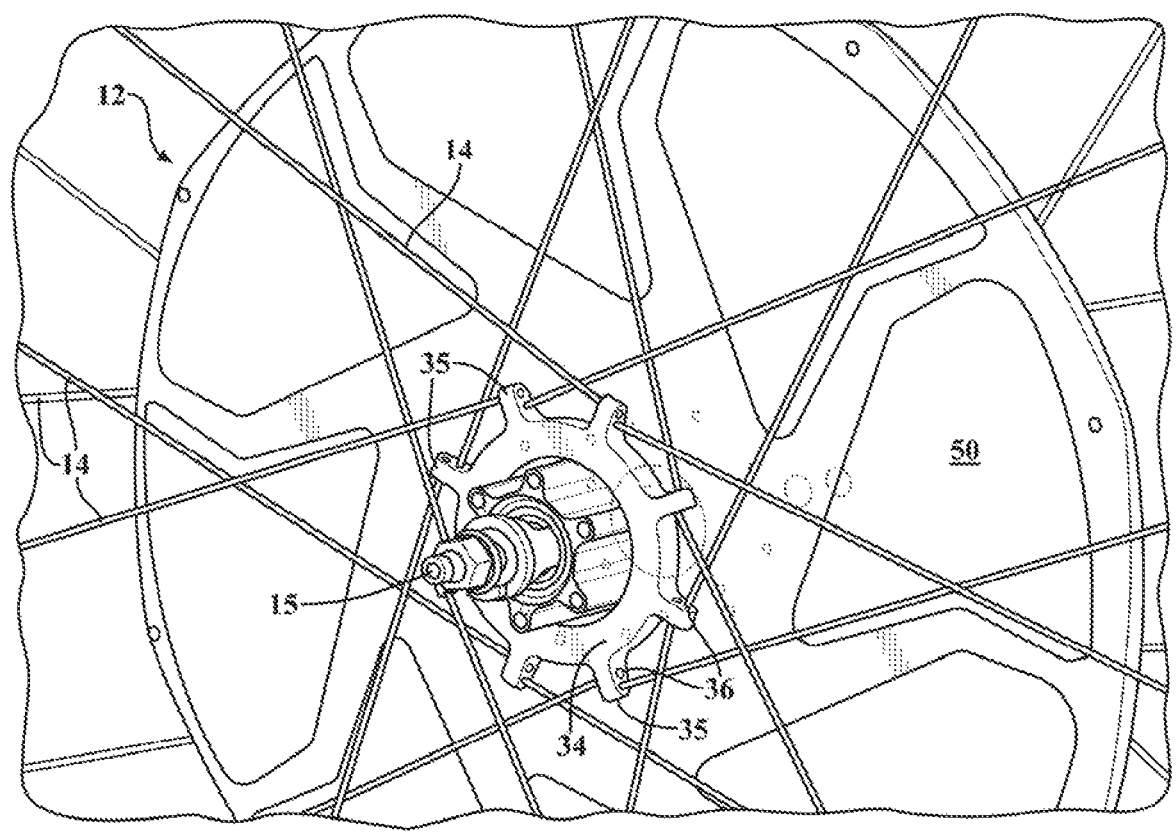
FIG. 2 is an enlarged perspective view of a driven-side or brake-side hub shell of the motorized wheel of FIG. 1.

Referring to the drawings and more specifically to FIGS. 1 and 2, a wheel with wheel motor in accordance with the present disclosure is generally shown at 10. The motorized wheel 10 is of the type that is used in vehicles such as bicycles, tricycles, scooters and any other appropriate type of vehicle. The motorized wheel 10 is shown in a configuration particularly well suited to be used in a bicycle, notably by the diameter and width of the motorized wheel 10. For example, the motorized wheel 10 is essentially similar to a back wheel of an adult size bicycle, such as a 700 mm wheel, a 650 mm wheel, a 26 inch wheel, a 29 inch wheel, (i.e., ISO5775, ISO 622 (700C and 29po), ISO 584 (650B), ISO 559 (26po)-range of 584 to 700 mm in diameter) despite the fact that wheels of smaller or larger diameters could be used as well. Moreover, although the motorized wheel 10 is shown as having a freehub or a freewheel hub for supporting a cassette of cogs or freewheel, as discussed hereinafter, the motorized wheel 10 could be without such a freewheel hub. As an example, the motorized wheel 10 could be used as the front wheel of a bicycle, which does not require a freewheel hub.

Figure 3:
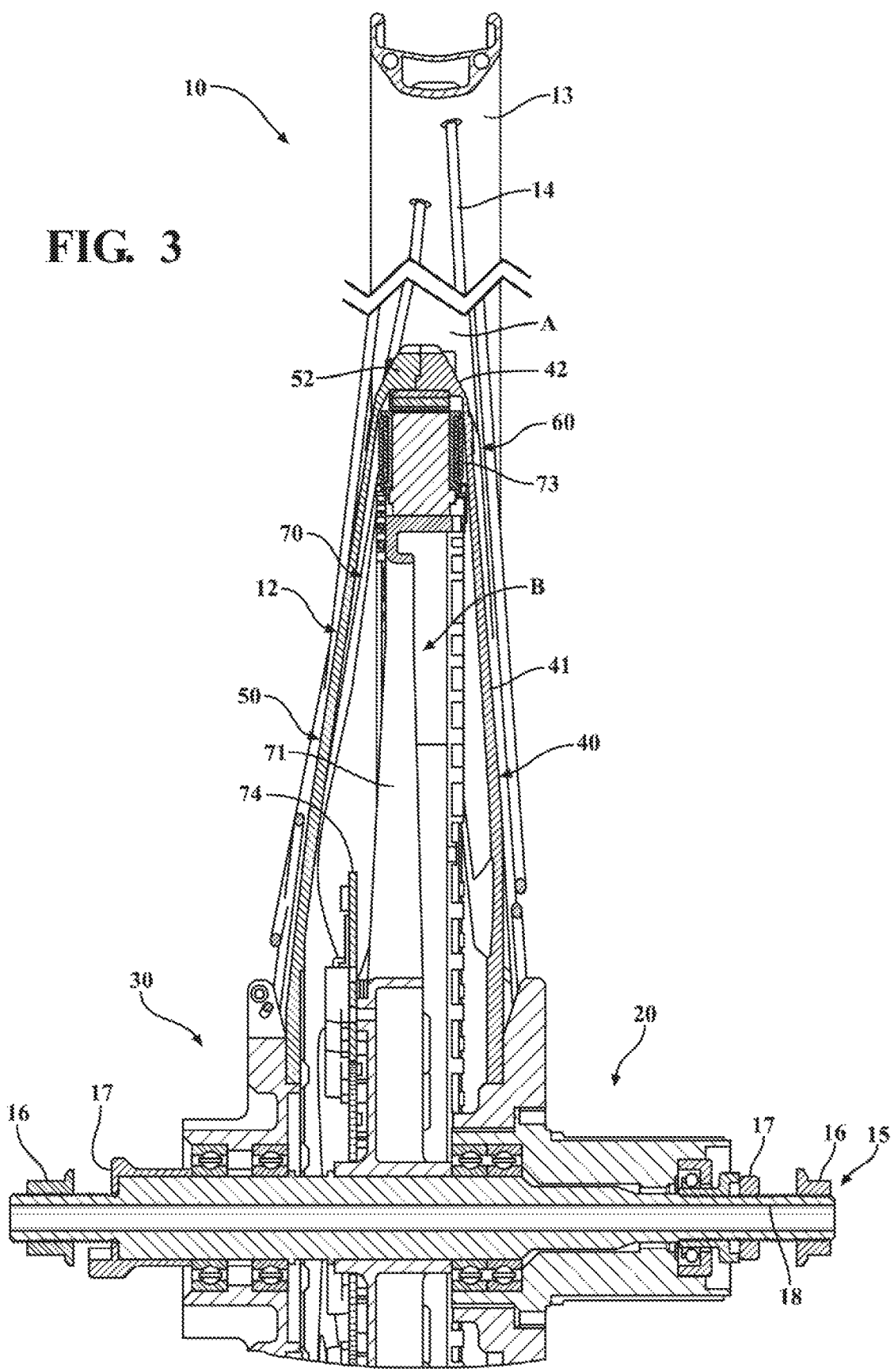
FIG. 3 is a sectional view of the motorized wheel of FIG. 1.

The motorized wheel 10 has a motorization apparatus featuring a synchronous machine 12. The synchronous machine 12 may also be referred to as a motor, a synchronous motor, an electric motor among other names. The synchronous machine 12 is configured to act as the hub of the motorized wheel 10 and is therefore connected to rim 13 by way of spokes 14, so as to transmit its output to the rim 13. It is observed that, in similar fashion to typical wheels, the spokes 14 define an inner volume A between innermost ones of the spokes 14 on either side of the motorized wheel 10, as best seen in FIG. 3. The inner volume A is bound by the rim 13 and by the spokes 14.

The synchronous machine 12 is substantially lodged into the inner volume A, and also serves as connection for ends of the spokes 14, in similar fashion to a hub. More specifically, as shown hereinafter, at least some of the active components of the machine 12 are in the inner volume A, including the rotor, magnets, stator coils, and/or stator, etc. An axle 15 will interface the synchronous machine 12 and thus the motorized wheel 10 to a frame component of the vehicle, for instance chain stays, a fork of a bicycle, or any other frame component, depending on the type of vehicle with which the motorized wheel 10 is used. The axle 15 has a given geometry that will be discussed hereinafter, but has ends extending beyond the synchronous machine 12, at which ends nuts 16 are provided along with spacers 17 of different shapes for the motorized wheel 10 to be releasably secured to a frame of the vehicle, for instance in the drop outs thereof. Although not shown, the axle, nuts and spacers may for instance be part of a quick release skewer. The axle 15 may also define an inner channel 18 by which wires may be introduced into the synchronous machine 12 to provide power to the synchronous machine 12 as well as commands.

Figure 4:
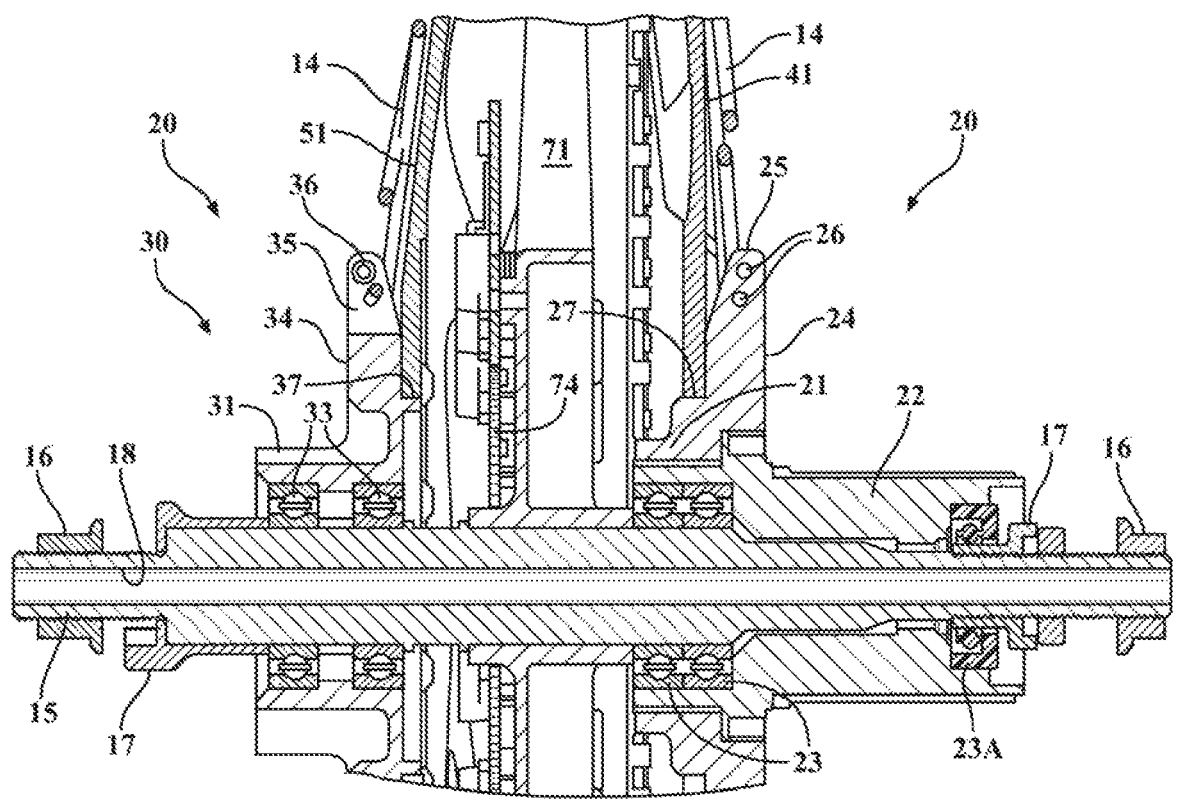
FIG. 4 is an enlarged sectional view of the motorized wheel as in FIG. 3, showing a hub thereof.
Figure 5:
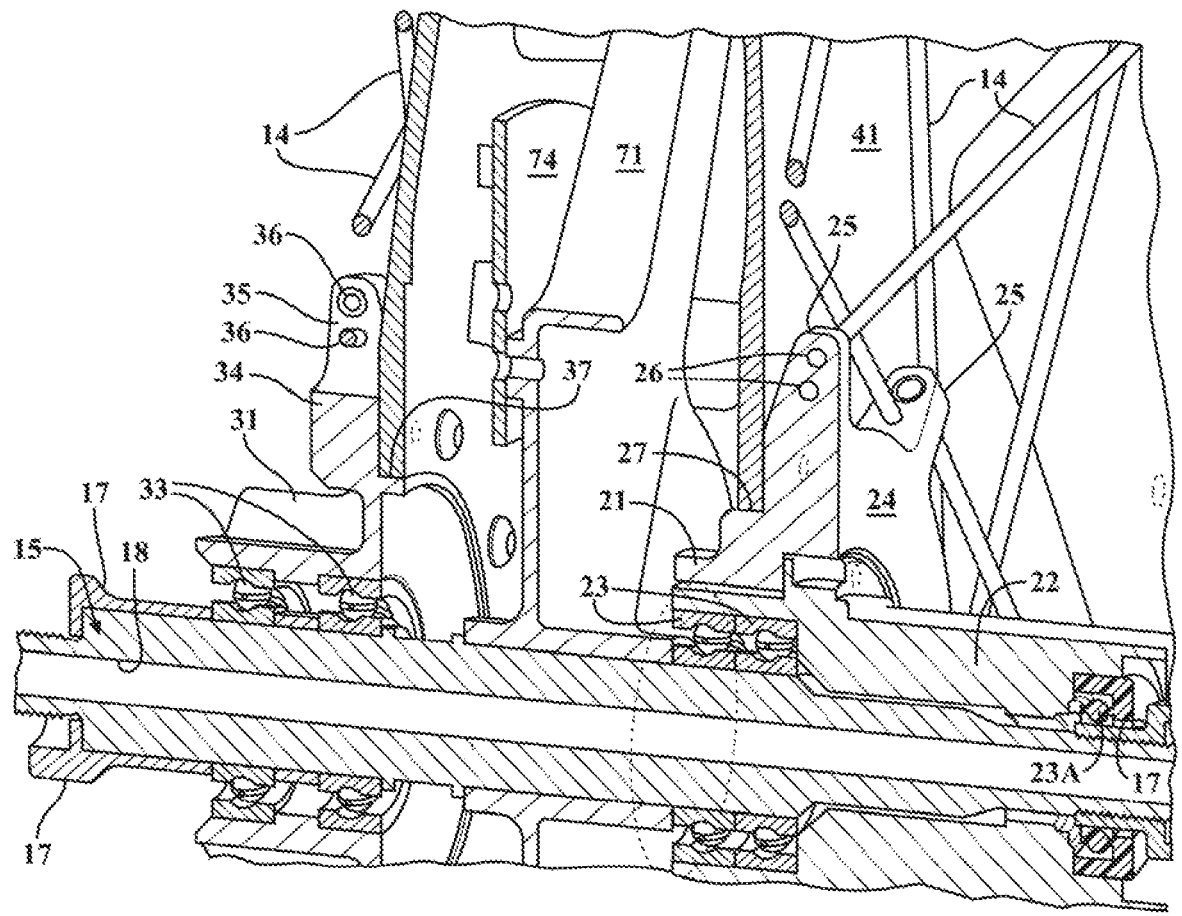
FIG. 5 is an enlarged perspective view of the hub of the motorized wheel of FIG. 1.
Figure 6:
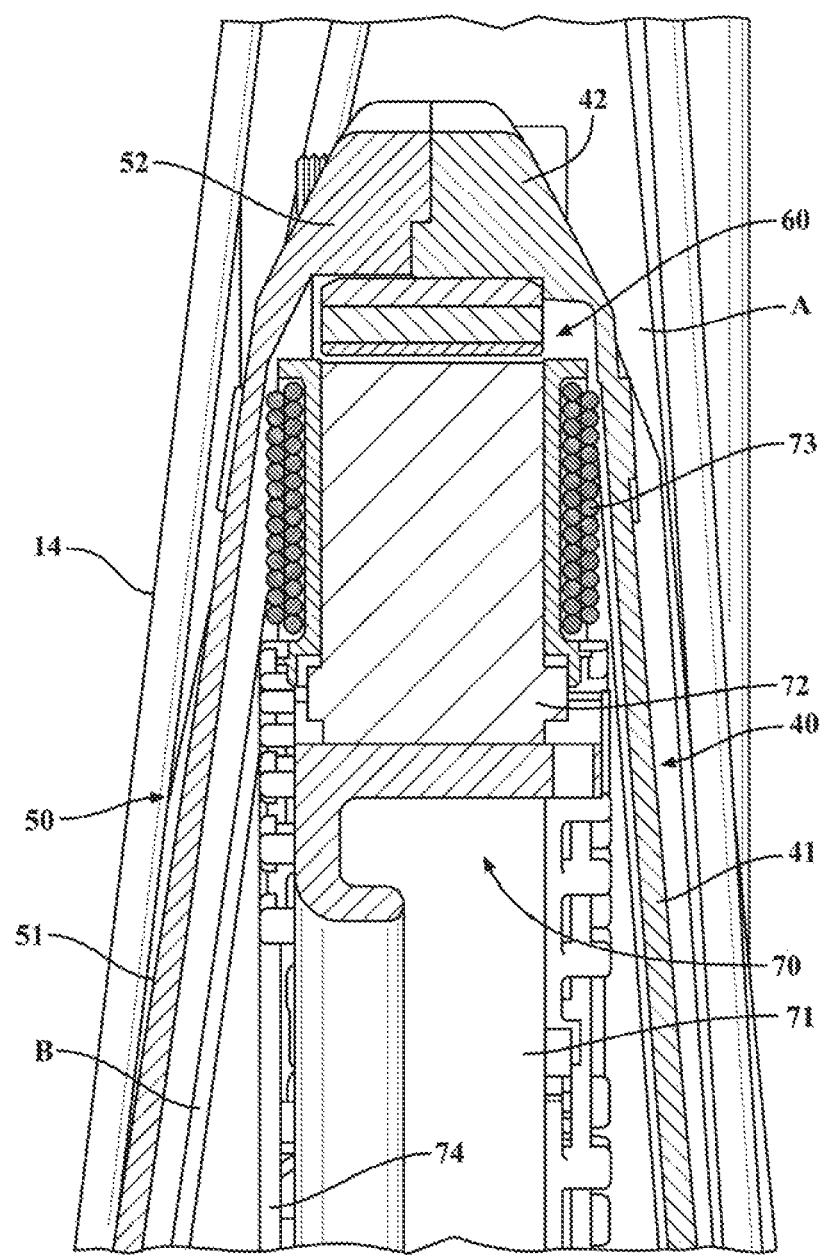
FIG. 6 is an enlarged sectional view of the motorized wheel as in FIG. 3, showing a rotor unit and a stator unit.
Figure 7:
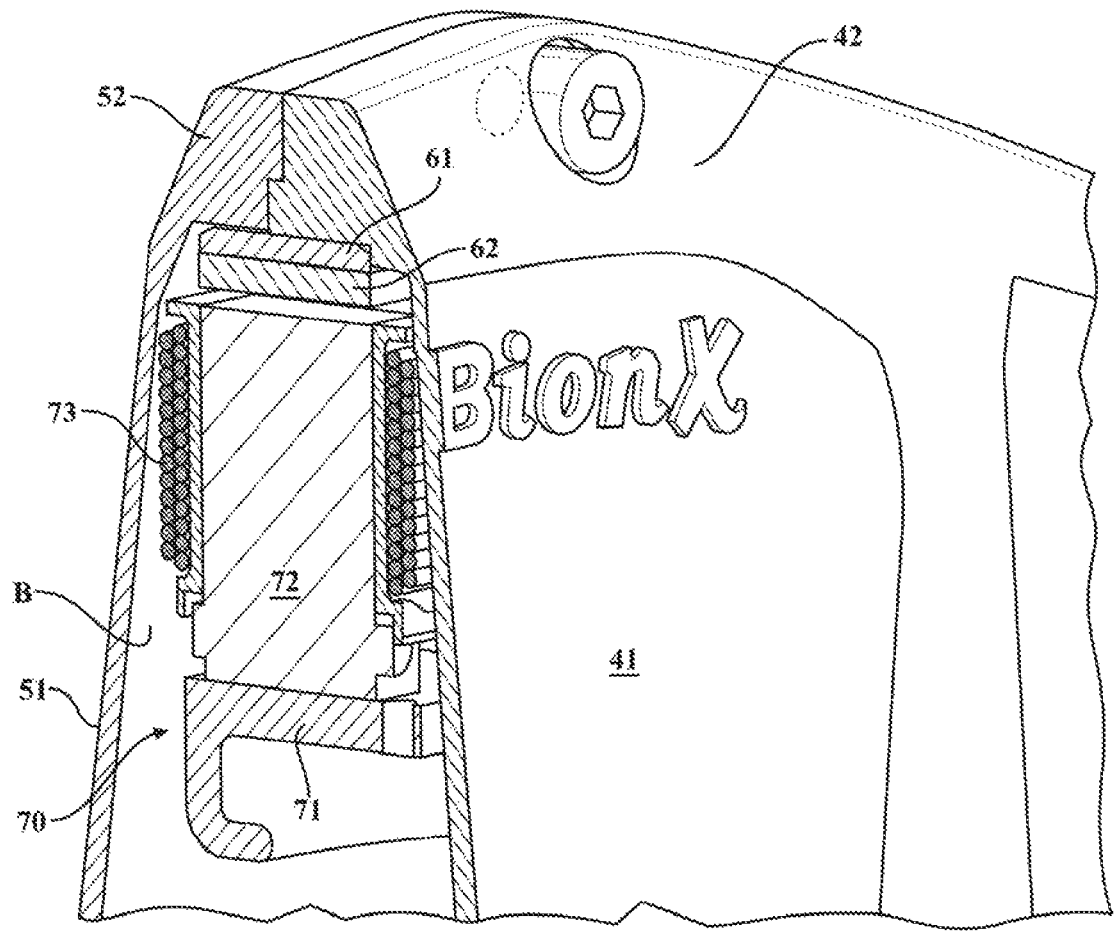
FIG. 7 is an enlarged perspective view of FIG. 6.

Referring concurrently to FIGS. 3, 4 and 5, the synchronous machine 12 is shown in greater detail as having a structure rotatably mounted to the axle, the structure comprising a drive side hub shell 20, a driven side hub shell 30, a drive side cover 40, a driven side cover 50. The spokes 14 are connected to the structure as described hereinafter for concurrent rotation. In FIGS. 5 to 7, a rotor unit 60 and a stator unit 70 are shown being located in an inner volume B of the structure, substantially defined by the covers 40 and 50 of the synchronous machine 12.

The drive side hub shell 20 is the component of the structure by which the synchronous machine 12 is rotatably mounted to the axle 15.

The driven side hub shell 30 is the component of the structure by which the synchronous machine 12 is rotatably mounted to the axle 15 on the driven side of the vehicle or the brake side in a configuration of the wheel 10 with a disc brake. In an embodiment of the motorized wheel 10 used without a freehub, there is no drive or driven side, whereby the hub shells 20 and 30 may be mirror images of one another. The hub shells 20 and 30 concurrently form the hub of the wheel 10.

The drive side cover 40 and the driven side cover 50 concurrently form the inner volume B of the synchronous machine 12 and will therefore concurrently house the rotor unit 60 and the stator unit 70, i.e., the active components of the synchronous machine 12.

The rotor unit 60 is fixably secured to the covers 40 and 50 and will provide rotational forces thereto, which rotational forces are sustained by the rotor unit 60 by the powering of the stator unit 70.

The stator unit 70 is fixed to the axle 15 for instance by way of spline arrangement, knurling, serrated spline, etc and therefore does not rotate with the rotor unit 60. The stator unit 70 provides driving forces that will induce a rotation of the rotor unit 60.

Referring concurrently to FIGS. 3 and 4, the drive side hub shell 20 is shown in greater detail. The drive side hub shell 20 has a tubular portion 21. The tubular portion 21 is generally coaxial with the axle 15. A freehub 22 is connected to the tubular portion 21, and bearings 23 rotatably support the tubular portion 21 about the axle 15. A pair of the bearings 23 are at an inside end of the tubular portion 21 and freehub 22, whereas a seal 23A is at the outer end of the freehub 22 (although a third bearing could be used instead of the seal 23A). As is known in the art, the freehub 22 rotates concurrently with the tubular portion 21 in one direction. By using a seal 23A instead of a bearing, the end of the freehub 22 is cantilevered and, as such, is particularly well suited to receive thereon strain gauges to measure the chain tension on the freehub 22 to calculate the pedaling power. In the other direction, a ratchet mechanism included in the freehub 22 will allow the freehub 22 to remain stationary while the tubular portion 21 (and thus the drive side hub shell 20) rotates. The freehub 22 may be a standard freehub. It is pointed out that, as an alternative to a freehub 22, a freewheel hub could be provided as well. Moreover, although not shown, it is contemplated to use an internal gear mechanism with the synchronous machine 12.

A radial flange 24 projects radially from the tubular portion 21. The radial flange 24 may have a crenellated periphery defining a plurality of spoke supports 25 by which ends of the spokes 14 will be connected to the drive side hub shell 20. Throughbores or holes 26 are therefore provided on the spoke supports 25 to receive the ends of the spokes 14. The holes 26 in the spoke supports 25 are one of multiple attachment members that may be used to connect spokes 14 to the structure, with other attachment members including tapped bores, nipples, etc. It is also considered to connect the spokes 14 directly to the tubular portion 21, with appropriate attachment members being provided in the tubular portion 21.

Referring to FIGS. 1 and 2, one contemplated wheel construction is shown with a given number of straight pull spokes. However, any other appropriate spoke arrangement is considered (e.g., hook spokes, etc). It is considered to use spokes of standard size and construction for convenience and ease of repair.

The drive side hub shell 20 defines a shoulder 27 of generally circular shape, upon which the drive side cover 40 will be abutted when the synchronous machine 12 is assembled. Fasteners such as bolts, screwing engagement, and/or adhesives, etc may be used to secure the cover 40 to the shell 20. Other connection arrangements are also considered for the junction of the cover 40 to the shell 20.

The driven side hub shell 30 is generally speaking a mirror image of the drive side hub shell 20, with the exception of the freehub 22, absent from the driven side hub shell 30, and with additional differences is general shapes, for example. Hence, the driven side hub shell 30 has a tubular portion 31 rotatably mounted to the axle 15 by bearings 33. A radial flange 34 with crenellated periphery for example projects from the tubular portion 31 and has spoke supports 35 by which the driven side hub shell 30 is connected to spokes 14. Throughbores 36 in the spoke support 35 will receive the ends of the spokes 14 (as one of numerous possible attachment members considered to connect the spokes 14 to the structure). A shoulder 37 is oriented toward the inner volume B and serves as an abutment for the driven side cover 50, although other connection arrangements are considered for the junction of the cover 50 to the shell 30.

Referring concurrently to FIGS. 5, 6 and 7, the drive side cover 40 is shown having a cover plate 41. A connector rim 42 is at an outer periphery of the cover plate 41 and will serve to connect the drive side cover 40 to the driven side cover 50. Driven side cover 50 also has a cover plate 51 and has a complementary connector rim 52 that will cooperate with the connector rim 42 in the manner shown in FIG. 6 to form the casing of the synchronous machine 12. Referring to FIG. 1, the cover plates 41 and 51 and the connector rims 42 and 52 are respectively fastened to the hub shells 20 and 30, and to one another by way of fasteners such as bolts, appropriate washers, bolts/screws and tapping, press-fitting, etc. It is shown that the covers 40 and 50 concurrently define an inner volume B. Moreover, the combined geometry of the covers 40 and 50 tapers in a radial direction, whereby a casing concurrently formed by the covers 40 and 50 fits inside the inner volume A defined by the spokes 14, as observed in FIG. 3. In any event, the structure has lateral walls, for instance as defined partially by the covers 40 and 50, which may or may not close the inner volume B.

Referring to FIG. 1, the covers 40 and 50 are shown having a generally octagonal outline, although other shapes may be used, such as circular, pentagonal, hexagonal, among numerous other possibilities. In order to optimize the performance of the motorized wheel 10, the covers 40 and 50 must be as light as possible, yet be capable of sustaining the stresses associated with a motorized wheel. For instance, the covers 40 and 50 may be in a non-ferrous material such as a composite material while the hub shells 20 and 30 are made of ferrous material or a metal, as the hub shells 20 and 30 are connected to the spokes 14. In selecting the materials, the coefficients of thermal expansion should be taken into consideration, so as not to impede the rotation of the rotor unit 60 relative to the stator unit 70. Moreover, although the hub shells 20 and 30 are shown as being separate from the covers 40 and 50, the structure could consist of the two half members, each half member being an integral assemble of hub shell (e.g., 20 or 30) and cover (e.g., 40 and 50). In such a case, the structure would have a hub portion integrated with a cover. Other arrangements are considered as well.

As shown in the embodiment of FIGS. 3 and 4, the cover plates 41 and 51 may be relatively thin, but with reinforcement ribs thereon. Due to the limited space within the inner volume A, there is limited space for the ribs on the outer surfaces of the cover plates 41 and 51. In the embodiment of FIG. 1, ribs are shown having different segments 53 and 54. The segments 53 each extend along a first one of the spokes 14, and when a second one of the spokes 14 crosses over the first spoke 14, the segments 53 end and the segments 54 commence, with the segments 54 extending along the second one of the spokes 14. Hence, each rib has a pair of segments 53, 54, to follow a pattern of the spokes 14. Although not visible, the cover 40 may have a similar pattern of ribs.

Figure 8:
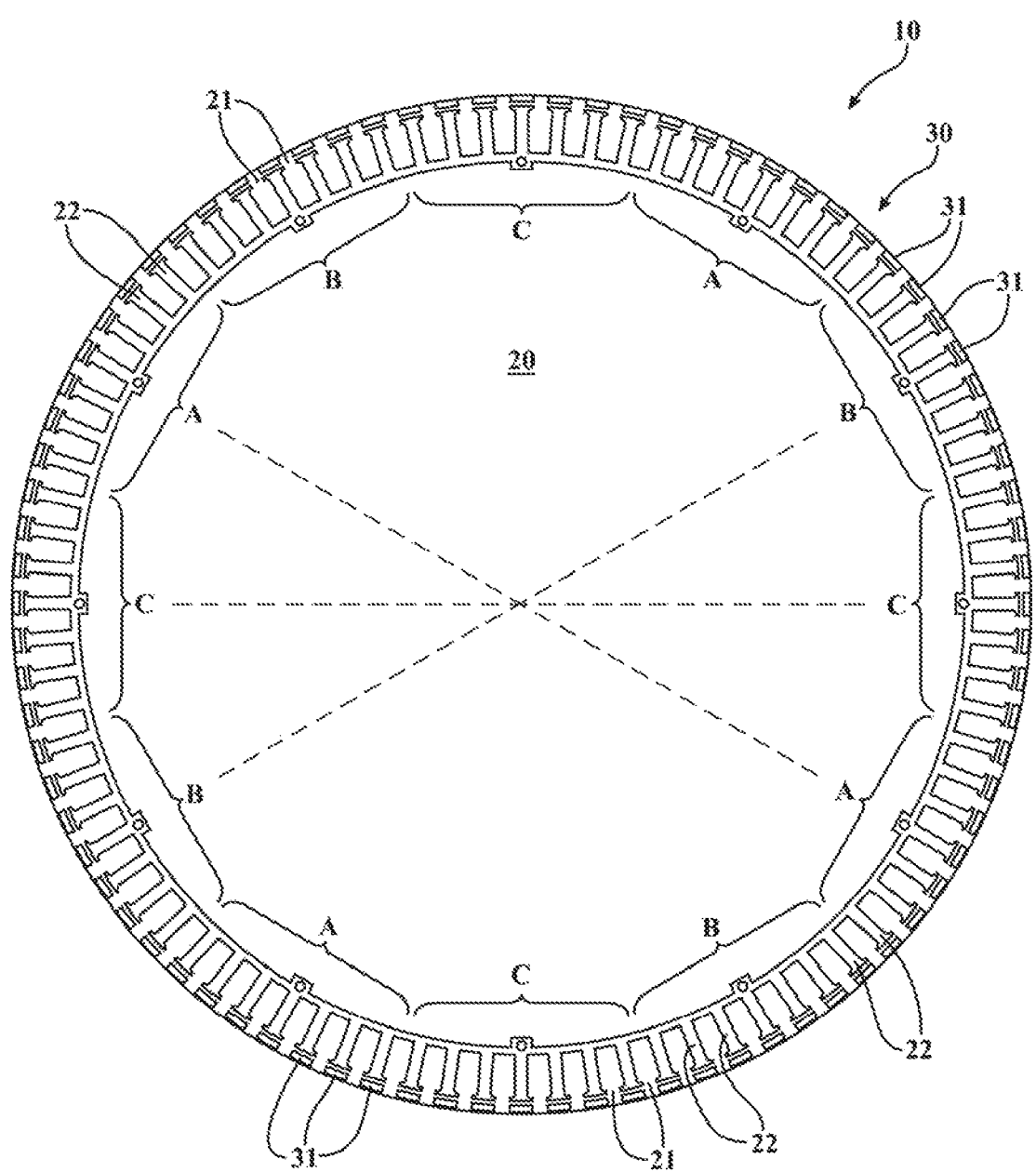
FIG. 8 is a schematic diagram of an exemplary rotor and stator of the motorized wheel of FIG. 1.

Referring concurrently to FIGS. 6, 7 and 8, the rotor unit 60 is shown as having an annular body 61. The annular body 61 serves as a support for magnets 62. The magnets 62 are typically made of a ferro-magnetic material and may be of any appropriate shape, such as rectangular shape. Any appropriate number of magnets could be used as a function of the configuration of the stator unit 70.

Still referring to FIGS. 6, 7 and 8, the stator unit 70 is shown as having a stator support 71 by which the stator unit 70 is fixedly secured to the axle 15. A yoke 72 is located on a circumferential surface of the stator support 71 and is configured to define a plurality of teeth 75, with windings 73 thereon. The stator support 71 may be configured to support a printed circuit board 74 that will communicate with the control by wires passing through the channel 18 of the axle 15, to control current circulation in the windings 73.

Any appropriate number of teeth for magnets is considered. For instance in FIG. 8, there is illustrated the yoke of the stator support 71 as having eighty-four slots, separated by teeth 75, typically made of iron (i.e., ferromagnetic material). Although not shown in FIG. 8 (but show in FIG. 6), the coils of insulated wire are wound about at least some of the teeth 75, in accordance with a phase interconnection described below.

The rotor unit 60 is mounted about the stator unit 70, and is separated from the stator unit 70 by a suitable clearance gap. In FIG. 1, there is illustrated eighty-eight of the permanent magnets 62, although eighty or ninety-two magnets may be used as well with the eighty-four slots of the stator unit 70. Due to the large diameter of the machine 10 (and resulting lever arm effect), the magnets 62 may be significantly reduced in size as compared to standard machines. Hence, the high number of poles reduces the iron volume. By increasing the number of poles, the flux per pole during operation is reduced as compared with a machine producing a similar power output with a lesser amount of poles. Accordingly, as the sectional dimensions of teeth are proportional to the flux, the sectional dimensions for a eighty-four slot machine are smaller than the sectional dimensions for the teeth of a machine with fewer slots, for a similar power output. There results a lower weight for the eighty-four slot machine when compared to machines having a fewer amount of poles for a similar power output.

The configuration of eighty-four slots allows some form of repeatability in the phase structure. The repeatability is well suited to balance radial forces on the axle, thereby reducing the subharmonics which may cause vibrations. An example of a phase interconnection of the machine 12 is shown, for the embodiment with eighty-eight magnets 62 for the eighty-four slots. The teeth 75 are regrouped in four continuous sets of teeth per phase, as shown by sets A, B, and C. According to one embodiment, each set comprises seven consecutive teeth 75. However, other arrangements of sets may also be used, for instance phases each consisting of a set of six and a set of eight consecutive teeth 75. It is also considered to have other phase configurations, for instance with four sets of six consecutive teeth 75, four sets of seven consecutive teeth 75, and four sets of eight consecutive teeth 75, as an example. Any appropriate number of consecutive teeth per set for a total of six sets may be used. By the arrangement of six sets of teeth with two sets per phase, it is observed that the four sets of a same phase are diametrically opposed in the stator unit 70, as shown by lines A-A, B-B, and C-C. In the embodiment featuring seven consecutive teeth per set, the centers of the sets of a same phase are diametrically opposed. Accordingly, the magnetic forces to which are exposed the sets of teeth 75 operated in a same phase oppose each other and minimize their effect on the center of the stator unit 70. With the 3-phase interconnection described above, the above-referred phase interconnections and components of the system of FIG. 8 may be off-the-shelf products.

In the embodiments of eighty-four slots and ninety-two magnets, the periodicity of the back EMF sinusoidal signal generated by the magnet is 2, so the teeth 75 are separated in two sets for each phase.

Although only shown schematically, the stator unit 70 has coils of insulated wire wound on the teeth 75. There are two coils per slot, although other suitable configurations may be used as well in the machine 12. Adjacent coils of a same set are typically wound in opposite directions.

The interconnection of phases and the coil winding may be any other appropriate alternative. For instance, there may be used a single coil per slot.

The 84-slot arrangement is relatively lightweight compared to machines with similar power output but with fewer poles, notably because of the substantial reduction of size of the magnets 62. The 84-slot arrangement on the other hand has greater diameter than machines with fewer poles, whereby the resulting machine is well suited to be wheel-mounted, as bicycle wheels commonly have large diameters, for instance between 584 mm and 700 mm (e.g., ISO5775: ISO 622 (700C and 29po), ISO 584 (650B), ISO 559 (26po)). Even more specifically, the 84-slot arrangement is relatively narrower compared to machines with similar power output but with fewer poles, resulting in a machine that is well suited to be mounted in between regular spoke patterns of a bicycle, not affecting the ride comfort of the bicycle. In the direct-drive configuration on a bicycle, the rotor may be operatively connected to a freehub as mentioned and illustrated in FIGS. 1-7, such that pedaling actuation is transmitted to the rotor via the cassette on the freewheel. On the other hand, in the absence of a pedaling input, the freehub 22 allows idling of the cassette while the machine 12 may actuate the wheel. As an alternative, the direct-drive configuration may be used for the front wheel of a bicycle.

Figure 9:
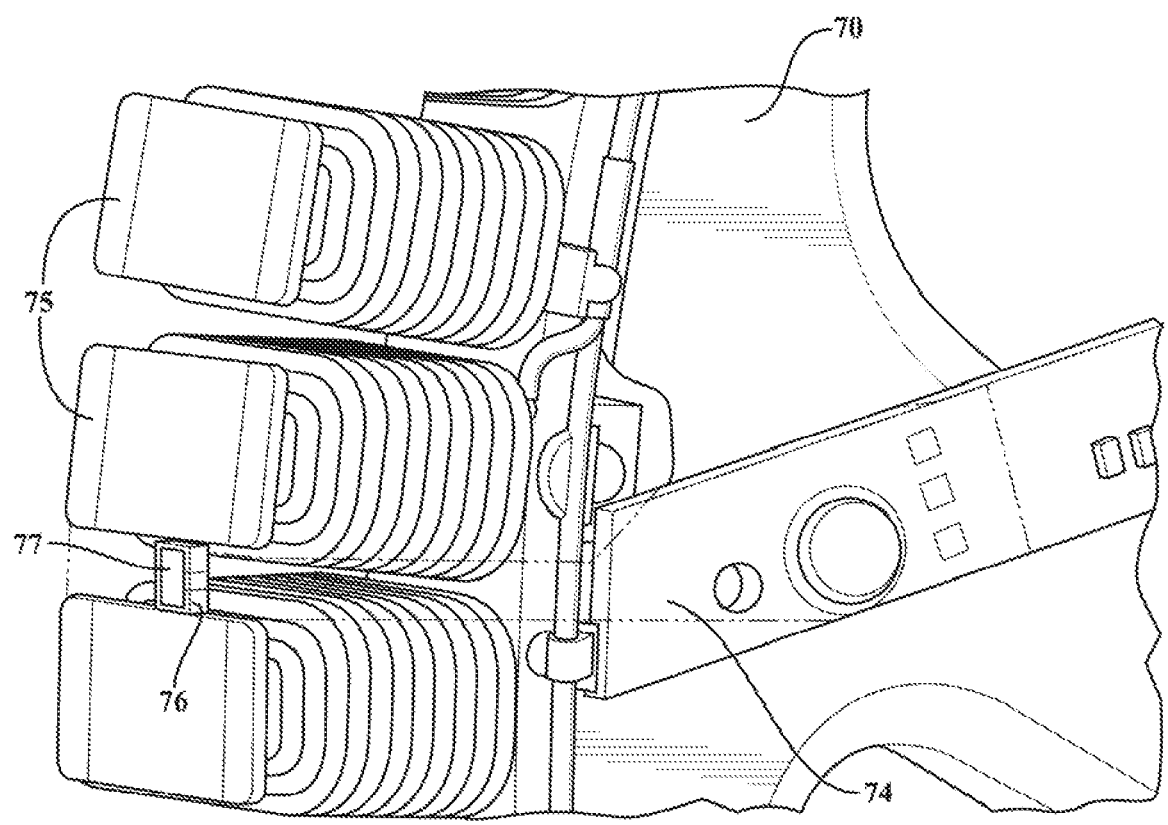
FIG. 9 is an enlarged view of a receptacle for receiving a sensor as positioned in a slot of the stator unit of motorized wheel of FIG. 1.

Referring to FIG. 9, there is illustrated an arrangement to ensure the precise positioning of sensors between the teeth 75 of the stator unit 70. A receptacle 76 is fixedly lodged between the teeth 75, the receptacle 76 being sized to accommodate a Hall effect sensor 77 or equivalent. The sensor 77 (a few of which are used but only one shown in FIG. 9) is connected to the printed circuit board 74, for instance by way of a flexible strip 78 (e.g., copper strips). Hence, the receptacle 76 is structurally connected to the teeth 75, and the sensor 77 may simply be inserted in the receptacle 76 to be aligned with the rotor unit 60 to measure the orientation of the rotor unit 60 relative to the stator unit 70.

Figure 10:
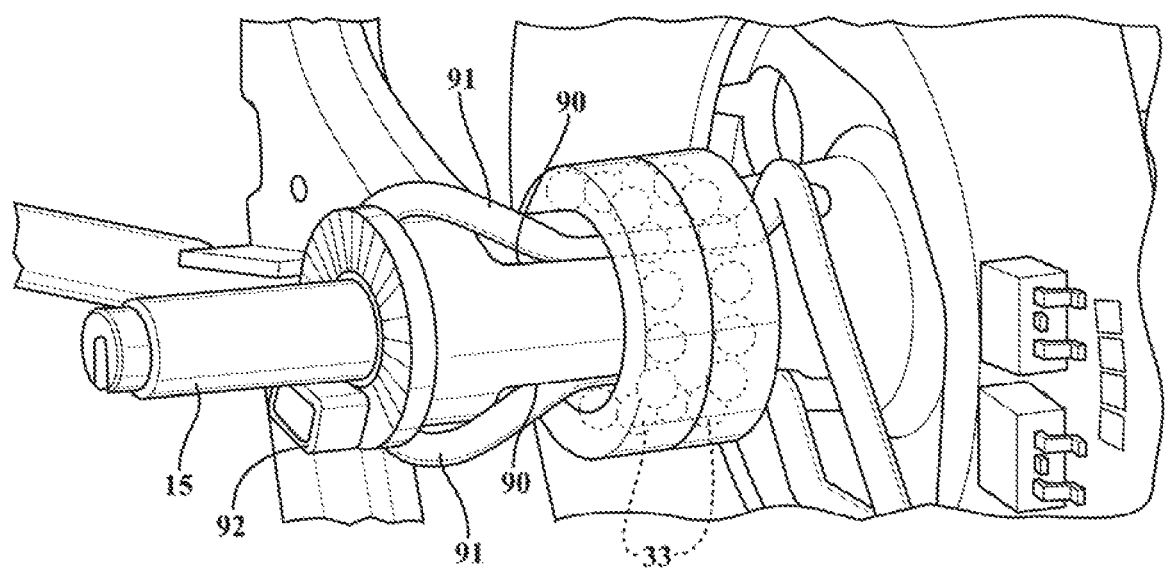
FIG. 10 is an enlarged view of an exemplary embodiment of an axle of motorized wheel of FIG. 1, in accordance with another embodiment.

Hence, the structure of the machine 12 has a geometry sized and shaped to fit in the inner volume A defined by the spokes 14. Conventional spoke arrangements can thus be used for the motorized wheel 10, with standard-size spokes. The use of such standard-size long spokes may result in a more effective wheel construction (in terms of mass, strength, assembly and/or comfort) than wheels in which short spokes extend from the circumference of the motor to the rim of the wheel. This specific arrangement of machine 12 serving as a hub for the wheel 10 allows the use of a large diameter motor, with the sturdy construction of long spoke wheels. For instance, the arrangement shown in the figures may have a ratio of maximum rotor radius to maximum rotor width of at least 10. The spokes 14 may connect to the structure of the machine 12 at a connection diameter ranging between 20 and 500 mm Referring to FIG. 10, an alternative embodiment of the axle 15 is shown, in which channels 90 are defined in the outer surface of the axle 15. The channels 90 represent a suitable configuration for wires 91 of the electronic components of the active components of the machine 12 to be routed out of the machine 12 to be connected to a battery and to a user interface, as commonly known and used for such machines. The configuration of FIG. 10 may increase the strength of the axle 15 and improve its waterproofness. An abutment 92 is also visible in FIG. 10, the abutment 92 cooperating with the walls of the dropouts to prevent rotation of the stator unit 70 relative to the frame of vehicle.

What is claims is:

1. A motorization apparatus for a motorized wheel comprising:
    an axle adapted to be secured to a frame of a vehicle;
    a rotor unit including one of eighty, eighty-eight, or ninety-two poles constructed with segments of permanent magnet material sequentially magnetized north and south;
    a stator unit secured to the axle and made of ferromagnetic material spaced inwardly from the rotor unit such that the rotor unit is rotatable about the stator unit, the stator unit having an outer diameter ranging between 150 mm and 500 mm and having eighty-four slots with teeth defined between adjacent slots;
    a three-phase winding with coils of insulated wire being wound around the teeth of the stator unit, the arrangement of coils is adapted to be powered to induce a rotation of the rotor unit relative to the stator unit;
    a structure supporting the rotor unit relative to the stator unit such that the rotor unit and the structure rotate about the stator unit, the structure including hub portions rotatably mounted to the axle, lateral walls defining an inner volume for the rotor unit and the stator unit, and attachment members adapted to be connected to spokes of the motorized wheel, the attachment members being located radially inward of the clearance gap between the rotor unit and the stator unit; and
    a rim adapted to be connected to the spokes, the spokes extending from the rim to the attachment members and defining a wheel inner volume, wherein the rotor unit is located within the wheel inner volume.

2. The motorization apparatus according to claim 1, wherein the rotor unit has eighty-eight poles, and wherein the three-phase winding is divided in four sets of consecutive teeth for each of the three phases.

3. The motorization apparatus according to claim 2, wherein each of the four sets of a same phase have two pairs of sets that are diametrically opposed in the stator unit.

4. The motorization apparatus according to claim 2, wherein the three-phase winding are divided into four sets of seven consecutive teeth for each of the three phases.

5. The motorization apparatus according to claim 2, wherein each phase of the three-phase winding is divided into sets of six and eight consecutive teeth.

6. The motorization apparatus according to claim 2, wherein each phase comprises 28 teeth.

7. The motorization apparatus according to claim 1, wherein sectional dimensions of the teeth are proportional to a flux per pole during operation of the motorization apparatus.

8. The motorization apparatus according to claim 1, wherein the hub portions are on opposing sides of the motorization apparatus and each include a tubular portion and at least one bearing per tubular portion connecting the tubular portion to the axle for rotation of the tubular portion relative to the axle.

9. The motorization apparatus according to claim 8, wherein each of the hub portions has a flange projecting radially from the tubular portion, and wherein the attachment members are located on the flange.

10. The motorization apparatus according to claim 1, wherein at least one channel is defined in an outer surface of a shaft for routing at least one cable for powering or controlling a power to the arrangement of coils, a first end of the at least one channel communicating with the inner volume of the structure, and a second end of the at least one channel being exterior to the structure.

11. The motorization apparatus according to claim 1, further comprising a printed circuit board secured to the stator unit and wired to the arrangement of coils; and at least one receptacle fixedly secured to the stator unit and positioned in one of the slots, the at least one receptacle adapted to receive therein a sensor of the printed circuit board to determine an orientation of the rotor unit relative to the stator unit.

12. A motorization apparatus for a motorized wheel, comprising:
    an outer rotor including one of eighty, eighty-eight, or ninety-two poles constructed with segments of permanent magnet material sequentially magnetized north and south, the outer rotor adapted to be part of the motorized wheel and rotating with the motorized wheel about an axis;
    a stator core of ferromagnetic material spaced inwardly of the outer rotor and defining a clearance gap with the outer rotor such that the outer rotor is rotatable about the stator core, the stator core having an outer diameter ranging between 150 mm and 500 mm, the stator core having eighty-four slots and defining teeth between the slots; and
    a three-phase winding with coils of insulated wire being wound around the teeth of the stator core.

13. The morotization apparatus according to claim 12, wherein the outer rotor has eighty-eight poles, and wherein the three-phase winding is divided in four sets of consecutive teeth for each of the three phases.

14. The motorization apparatus according to claim 13, wherein each of the four sets of a same phase have two pairs of sets that are diametrically opposed in the stator core.

15. The motorization apparatus according to claim 13, wherein the three-phase winding are divided into four sets of seven consecutive teeth for each of the three phases.

16. The motorization apparatus according to claim 13, wherein each phase of the three-phase winding is divided into sets of six and eight consecutive teeth.

17. The motorization apparatus according to claim 13, wherein each phase comprises 28 teeth.

18. The motorization apparatus according claim 12, wherein the stator core is fixed to an axle of the wheel.

19. The motorization apparatus according to claim 12, wherein the outer rotor is adapted to be operatively connected to one of a freewheel and a freewheel hub of a vehicle to rotate therewith in one rotational orientation.

20. The motorization apparatus according to claim 12, wherein sectional dimensions of the teeth are proportional to a flux per pole during operation of the motorization apparatus.

\* \* \* \* \*